United States Patent
Saito et al.

[11] Patent Number: 5,112,660
[45] Date of Patent: May 12, 1992

[54] REFRIGERANT-IMPERMEABLE HOSE

[75] Inventors: Tomoji Saito; Akira Sato, both of Hiratsuka, Japan

[73] Assignee: The Yokohama Rubber Co., Inc., Tokyo, Japan

[21] Appl. No.: 535,146

[22] Filed: Jun. 8, 1990

[30] Foreign Application Priority Data

Jun. 28, 1989 [JP] Japan .................................. 1-166168

[51] Int. Cl.$^5$ ................................................ F16L 11/04
[52] U.S. Cl. .................................. 428/36.8; 428/36.2; 428/36.91; 138/126; 138/153
[58] Field of Search ................... 428/36.2, 36.91, 36.8; 138/126, 125, 153

[56] References Cited

U.S. PATENT DOCUMENTS

| | | | |
|---|---|---|---|
| 3,682,202 | 8/1972 | Buhrmann | 138/126 |
| 4,111,237 | 9/1978 | Mutzner | 138/125 |
| 4,431,031 | 2/1984 | Ettlinger | 138/126 |
| 4,633,912 | 1/1987 | Pilkington | 428/36.2 |
| 4,734,305 | 3/1988 | Sujimoto | 428/36.2 |

Primary Examiner—James J. Seidleck
Assistant Examiner—Rena L. Dye
Attorney, Agent, or Firm—Finnegan, Henderson, Farabow, Garrett & Dunner

[57] ABSTRACT

Hoses are disclosed for transporting refrigerant media and a 1,1,1,2-tetrafluoroethane gas in particular. An inner tube is formed of a rubber composition comprising a selected ethylene-propylene-diene rubber and having a specified permeation limit of the gas. Disposed around the inner tube are a reinforcing layer and then an outer cover. The resulting hose is highly impermeable to gas and to water, sufficiently resistant to heat and fully free from maintenance.

8 Claims, 2 Drawing Sheets

REFRIGERANT-IMPERMEABLE HOSE

BACKGROUND OF THE INVENTION

1. Field of the Invention

This invention relates to hose constructions and more particularly to a hose for use in transporting or otherwise handling refrigerants predominantly of 1,1,1,2-tetrafluoroethane.

2. Description of the Prior Art

Dichlorodifluoromethane among various gases of Freon TM, commonly called CFC 12, has been reputed as a refrigerant fluid for instance in car coolers used under adversely vibrating conditions. To suit the transport of CFC 12 a variety of hoses are known, a typical example of which is built with an inner tube formed of a rubber of high resistance to gas leak, say a nitrile-butadiene rubber (NBR) for CFC 12. Another hose involves the assembly of an inner tube of a composite structure having a resinous layer and a rubbery layer.

From protective standpoints of global environment, however, the current trends in industry have been directed toward phasing out the use of CFC 12 tending to cause ozone depletion. CFC 12 is extremely undecomposable and necessarily afloat in the troposphere over a long period of time. The gas in turn rises into the stratophere where it decomposes on exposure to ultraviolet rays and develops chlorine with the results that the byproduct invites catalytic destruction of ozone, eroding the ozone layer that screens out dangerous solar rays. This will in some instances induce physical hazards such as cutaneous cancer, catarast and deficient immunity.

Included in good replacements is 1,1,1,2-tetrafluoroethane, $CF_3CH_2F$, also termed HFC 134a. Due to the hydrogen atoms present in the molecule, such chemical is relatively easy to decompose even in the troposphere. This means that HFC 134a will provide less tendency of entering the stratophere, and even if so, damaging the ozone layer as it has no chlorine atoms in the molecule.

The HFC 134a gas has been found considerably different from CFC 12 in regard to the physicochemical behavior against rubber material; that is, NBR rubbers in actual use are not effective to attain impermeability of HFC 134a as against CFC 12. An urgent need, therefore, has arisen for hoses that can exhibit sufficient leak resistance to HFC 134a and other important qualities including water proofness and heat resistance.

SUMMARY OF THE INVENTION

With the foregoing situation of the prior art in view, the present invention seeks to provide a new hose for use in transporting refrigerant fluids which will enable economical feasibility and provide a good balance of high impermation to HFC 134a in particular, sufficient proofness to water and adequate resistance to heat and also have full freedom from maintenance, thus ensuring efficient operation of gas transport.

The above and other objects and features of the invention will become readily understood from the following description upon reading in conjunction with the accompanying drawings.

More specifically, the invention provides a hose for the transport of refrigerants including a 1,1,1,2-tetrafluoroethane gas (HFC 134a), which comprises an inner tube, a reinforcing layer and an outer cover superimposed in the order mentioned, the inner tube being formed of a rubber composition comprising an ethylene-propylene-diene rubber as a base rubber and having a gas permeation of not more than 35 gf/m/72 hr as vulcanized and determined by the JRA 2001 method in terms of HFC 134a.

DETAILED DESCRIPTION OF THE INVENTION

Figure 1:
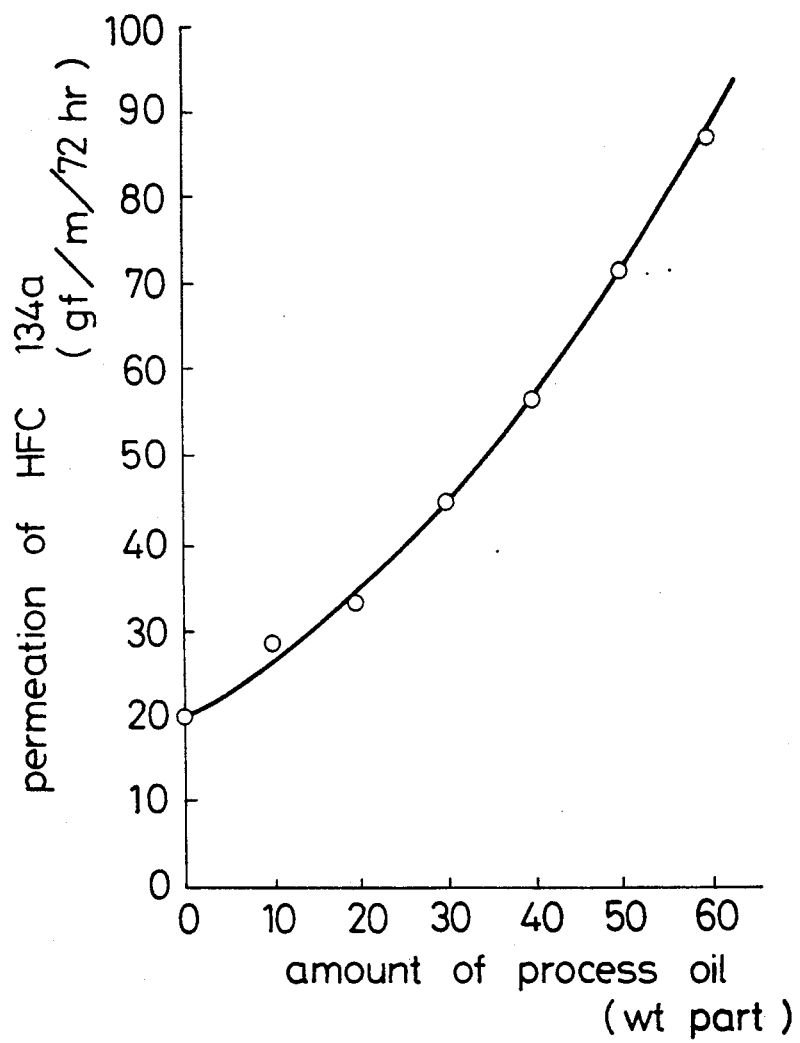
FIG. 1 is a graphic representation of the permeation of HFC 134a plotted against the amount of process oil blended with a rubber composition according to the present invention.

Hoses according to the present invention, contemplated for utility in transporting refrigerants composed mainly of HFC 134a, are constructed essentially with an inner tube, a reinforcing layer and an outer cover laminated one on another in that order. The inner tube is formed of a rubber composition in which an ethylene-propylene-diene terpolymer (EPDM) as a base rubber is blended usually with additives in common use such for example as a vulcanizing agent, a filler, a reinforcing agent, an antioxidant and the like. Various other additives may if necessary be incorporated which are chosen from one or more vulcanizing accelerators, a softener, a tackifier, a lubricant, a peptizer, a dispersant, a processing aid and the like.

Base rubbers eligible for purposes of the invention are EPDMs obtainable by copolymerizing ethylene and propylene with a diene monomer. Specific examples of diene monomers include methylene norbornene, ethylidene norbornene, dicyclopentadiene, 1,4-hexadiene, methyl tetrahydroindene and the like. The iodine value is taken, commonly known in the art, as a measure of the content of a diene unit bonded to the ultimate rubber. The base rubber may preferably range in iodine value from 15 to 50. Less than 15, though dependent upon the formulation of a rubber mix, would make the latter mix rather permeable to HFC 134a, and more than 50 would produce an EPDM rubber of insufficient elasticity.

The rubber composition according to the invention is acceptably receptive to two modes of vulcanization, one being with the use of sulfur as a vulcanizing agent and the other with an organic peroxide.

When sulfur vulcanization is desired, at least one vulcanizing accelerator is usually added which may be selected for instance from thiurams, dithiocarbamate salts, thiazoles and the like either alone or in combination. Organic compounds suitable for peroxide vulcanization are dialkyl peroxides and peroxyketals. Particularly preferred are dialkyl peroxides having a decomposition temperature of not lower than 90° C., preferably of higher than 117° C. The temperature just referred to is defined as one at which a peroxide is allowed to show a half life of 10 hours. Included in specific examples are di-t-butyl peroxide, dicummyl peroxide, 2,5-dimethyl-2,5-di-t-butylperoxyhexane, 2,5-dimethyl-2,5-di-t-butylperoxyhexane-3, 1,3-bis(t-butylperoxyisopropyl)benzene and the like.

The vulcanizing agent, sulfur or peroxide, may be added in a mol ratio preferably of 1/10 to 1/300, more preferably of 1/20 to 1/150, based on 100 parts by weight of the base rubber. Smaller ratios than 1/300 would render the resulting rubber mix susceptible to poor vulcanization and hence inadequate adhesion. Greater than 1/10 would be responsible for insufficient heat resistance of the final vulcanizate and objectionable scorching while in vulcanization.

Importantly, the rubber composition according to the invention when vulcanized should be held at a gas permeation level of HFC 134a of less than 35 gf/m/72 hr. This level, measured by the JRA 2001 method of the Japan Refrigeration and Air-Conditioning Industry Association, is approved commercially acceptable as considered from the leak limit of the CFC 12 gas in question.

HFC 134a varies in permeability with the amount of a softener typified by a process oil and employed as a rubber additive. The more process oil, the more leaky the gas is. Such permeation quality depends also upon the iodine value of EPDM in the case of sulfur vulcanization. Sulfur reacts with the diene component in EPDM to thereby form sulfide crosslinks. Higher diene contents in that rubber, hence greater iodine values, give rise to more densely crosslinked configuration, meaning that the resultant vulcanizate becomes highly resistant to gas leak. Departures from the iodine value range specified above, however, should be avoided to preclude quality deterioration of the vulcanizate.

To facilitate clarification of the roles of those parameters, the correlation between the permeation of HFC 134a and the amount of process oil is illustrated in FIG. 1. Used are an EPDM rubber regulated in its iodine value to 22 and different rubber compositions formulated to have varied amounts of process oil and vulcanized with sulfur. All process oil amounts are by weight part per 100 parts by weight of EPDM. Gas leak has been found frequent with increases in process oil.

Figure 2:
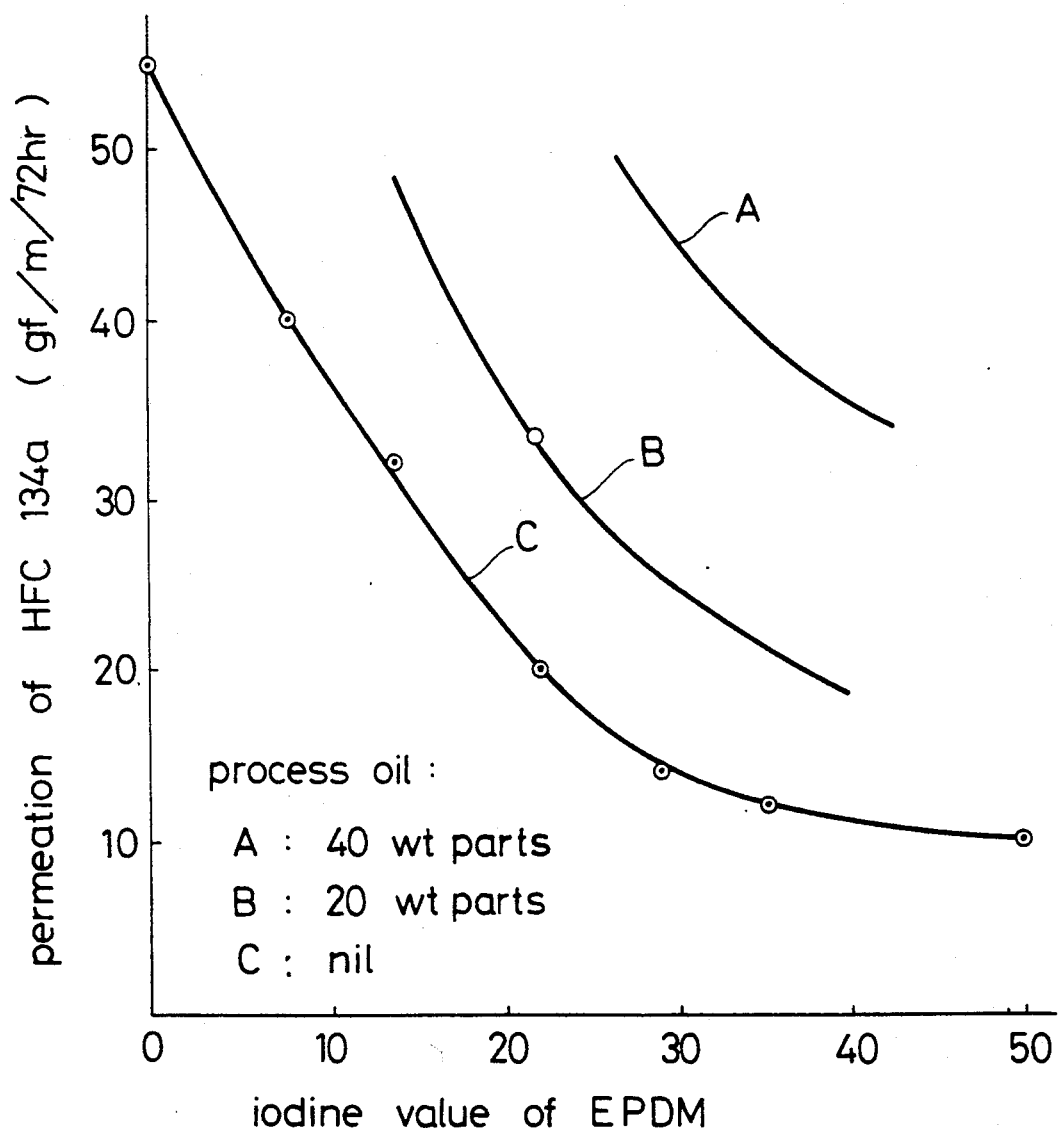
FIG. 2 is a view similar to FIG. 1 but explanatory of the correlation between the permeation of HFC 134a and the iodine value of a base rubber present in the rubber composition of FIG. 1.

In FIG. 2 the permeation of HFC 134a is plotted against the iodine value of EPDM. Rubber compositions tested are as sulfur-vulcanized with three different levels of process oil, i.e. 0, 20 and 40 parts by weight. Lesser process oil has led to better gas impermeability, the finding of which may help in quantitative determination of process oil to incorporate in a rubber composition.

To reduce leak of HFC 134a to an absolute minimum, the inner tube of the hose according to the invention may preferably have a thickness in the range of 1 to 5 mm.

A reinforcement is braided peripherally over the inner tube by the use of any suitable strip preferably of rayon, polyester or the like accepted in the industry. A cover is disposed over the braiding by extrusion of a given rubber selected conveniently from the same EPDM as above noted in connection with the inner tube, EPDMs of different compositions, chloroprene rubber, butyl rubber and the like.

The hose of the invention may be produced in conventional fashion with utmost ease and simplicity as will be described below.

A release-treated mandrel is passed through a first extruder where a predetermined rubber composition is extruded around the mandrel to form an inner tube. Reinforcement is effected onto the inner tube by means of a braiding machine after which a cover is laminated on a second extruder. The resulting hose construction is lead-covered or cloth-wrapped and then vulcanized under pressure at from 130° to 170° C., preferably from 140° to 160° C. On cooling the mandrel is pulled out of the vulcanizate to provide a desired hose.

EXAMPLES

The present invention will be further described by way of the following examples which are provided for purposes of illustration. In these examples all formulations are given by weight part.

Different rubber compositions shown in Tables 1 and 2 were extruded onto a release-treated mandrel to an inside diameter of 10.3 mm and to a thickness of 3.8 mm, thereby forming inner tubes. Overlaid each of the inner tubes was a single layer of reinforcement by braiding rayon strip, followed by lamination of an outer cover to a thickness of 1.1 mm by extrusion of a rubber mix shown in Table 3. Pricking was done on to the cover. The resultant hose assembly was vulcanized under pressure at 160° C. and thereafter cooled, and the mandrel was pulled out of the vulcanizate. There was thus produced a test hose.

All the hoses were examined for permeation of HFC 134a, proofness to water and resistance to heat under the conditions indicated below and with the results shown in Tables 1 and 2 and FIGS. 1 and 2.

Permeation of HFC 134a

JRA 2001 was followed. A coupler-jointed hose of 45 cm in length was charged with HFC 134a in a volume of $0.6 \pm 0.1$ g/cm$^3$, followed by standing in a gear oven at 100° C. for 96 hours. Weight loss, hence gas leak, was measured between lapses of 24 and 96 hours and converted to a unit of gf/m/72 hr.

Proofness to Water

A hose after being diposed in an oven at 50° C. for 5 hours was filled with a dessicant, molecular sieve 3A, in a volume of 80% to the hose volume. The hose was sealed and allowed to stand at a temperature of 50° C. and at a relative humidity of 95%. After lapse of 480 hours the dessicant was weighed from which the water content in that agent was counted and converted to a unit of mg/cm$^2$/day.

Resistance to Heat

A hose was aged by standing in a gear oven at 120° C. for 168 hours. A specimen was cut out of the inner tube and subjected to tensile testing according to JIS K-6301. Determination was made by taking heat resistance before aging, tensile product, as a standard of 100%. As grading symbols "⊚" stands for a heat resistance of greater than 90%, "○" for from 70 to 89% and "Δ" for from 50 to 69%.

To gain improved impermeability of HFC 134a, the amount of process oil to be added should be reduced as has been confirmed from Table 1 and FIG. 1. EPDMs have been proved generally acceptable with respect to water proofness and heat resistance (Examples 1 to 3 and Comparative Examples 1 to 4).

EPDMs of iodine values within the scope of the invention are highly satisfactory, as is apparent from Table 2 and FIG. 2, in respect of all the test characteristics (EPDM-2 to EPDM-5, Examples 4 to 8). EPDM of reduced iodine value revealed increased gas leak (EPDM-1, Comparative Example 6). A control or ethylene-propylene rubber (EPM), though superior in heat resistance, was unacceptable in gas impermeability (Comparative Example 5).

As appears clear from Examples 7 and 8, sulfur vulcanization and peroxide vulcanization are equally applicable in the practice of the invention.

Various changes and modifications may be made in the preferred embodiment specified above without departure from the scope of the appended claims.

TABLE 1

| Formulations/Properties | Comparative Examples | | | | Examples | | |
|---|---|---|---|---|---|---|---|
| | 1 | 2 | 3 | 4 | 1 | 2 | 3 |
| EPDM, Mitsui 4021[1] | 100 | 100 | 100 | 100 | 100 | 100 | 100 |
| carbon black, FEF | 140 | 130 | 120 | 105 | 90 | 80 | 70 |
| zinc oxide | 5 | 5 | 5 | 5 | 5 | 5 | 5 |
| stearic acid | 1 | 1 | 1 | 1 | 1 | 1 | 1 |
| process oil, paraffinic | 60 | 50 | 40 | 30 | 20 | 10 | 0 |
| sulfur | 1 | 1 | 1 | 1 | 1 | 1 | 1 |
| Nocceler-CZ-PO[2] | 1.5 | 1.5 | 1.5 | 1.5 | 1.5 | 1.5 | 1.5 |
| Sunceler-TRA[3] | 0.5 | 0.5 | 0.5 | 0.5 | 0.5 | 0.5 | 0.5 |
| Nocceler-TT-PO[4] | 0.5 | 0.5 | 0.5 | 0.5 | 0.5 | 0.5 | 0.5 |
| HFC 134a permeation, gf/m/72 hr | 87 | 72 | 56 | 45 | 33 | 28 | 20 |
| water proofness, mg/cm²/day | 0.3 | 0.3 | 0.2 | 0.2 | 0.2 | 0.3 | 0.2 |
| heat resistance | | | | | | | |

[1] iodine value 22, Mitsui Petrochemicals Co.
[2] accelerator, Ohuchi Shinko Chemical Co.
[3] accelerator, Sanshin Chemical Industry Co.
[4] accelerator, Ohuchi Shinko Chemical Co.

TABLE 2

| Formulations/Properties | Comparative Examples | | Examples | | | | |
|---|---|---|---|---|---|---|---|
| | 5 | 6 | 4 | 5 | 6 | 7 | 8 |
| EPM, EP 11[5] | 100 | | | | | | |
| EPDM-1[6] | | 100 | | | | | |
| EPDM-2[7] | | | 100 | | | | |
| EPDM-3[8] | | | | 100 | | | |
| EPDM-4[9] | | | | | 100 | | - |
| EPDM-5[10] | | | | | | 100 | 100 |
| carbon black, FEF | 70 | 70 | 70 | 70 | 70 | 70 | 70 |
| zinc oxide | 5 | 5 | 5 | 5 | 5 | 5 | 5 |
| stearic acid | 1 | 1 | 1 | 1 | 1 | 1 | 1 |
| sulfur | | 1 | 1 | 1 | 1 | 1 | |
| Nocceler-CZ-PO[2] | | 1.5 | 1.5 | 1.5 | 1.5 | 1.5 | |
| Sunceler-TRA[3] | | 0.5 | 0.5 | 0.5 | 0.5 | 0.5 | |
| Nocceler-TT-PO[4] | | 0.5 | 0.5 | 0.5 | 0.5 | 0.5 | |
| Perkerdox 14/40[11] | 7 | | | | | | 7 |
| HFC 134a permeation, gf/m/72 hr | 55 | 40 | 32 | 20 | 12 | 10 | 23 |
| water proofness, mg/cm²/day | 0.3 | 0.3 | 0.2 | 0.2 | 0.2 | 0.2 | 0.2 |
| heat resistance | ⊙ | | | | | | ⊙ |

[5] iodine value 0, Japan Synthetic Rubber Co.
[6] iodine value 8, comparative
[7] iodine value 15, inventive
[8] iodine value 22, inventive
[9] iodine value 35, inventive
[10] iodine value 50, inventive
[11] organic peroxide, peroxide content 40%, Kayaku Akzo Co.
[2]-[4] see footnotes to Table 1

TABLE 3

| Formulation | Amount |
|---|---|
| EPDM, Mitsui 4021[1] | 100 |
| carbon black, FEF | 120 |
| zinc oxide | 5 |
| stearic acid | 1 |
| process oil, paraffinic | 40 |
| sulfur | 1 |
| Nocceler-CZ-PO[2] | 1.5 |
| Sunceler-TRA[3] | 0.5 |
| Nocceler-TT-PO[4] | 0.5 |

[1]-[4] see footnotes to Table 1

We claim:

1. A hose for use in transporting refrigerant fluids which comprises an inner tube, reinforcing layer and an outer cover superimposed in the order mentioned, said inner tube being formed of a rubber composition comprising an ethylene-propylene-diene terpolymer as a base rubber, said base rubber having an iodine value of from 15 to 50, rubber composition containing not more than 20 parts by weight of process oil per 100 parts by weight of said ethylene-propylene-diene terpolymer, and said rubber composition having a 1,1,1,2-tetrafluroethane gas permeation level of not more than 35 gf/m/72 hr as vulcanized when heated at 100° C. and measured over a period of time of from 24 hours to 96 hours.

2. The hose according to claim 1 wherein said rubber composition is vulcanized and contains a sulfur or peroxide vulcanizing agent.

3. The hose according to claim 2 wherein said rubber composition when subjected to sulfur vulcanization is blended with a vulcanizing accelerator.

4. The hose according to claim 2 wherein said rubber composition when subjected to peroxide vulcanization is blended with an organic peroxide.

5. The hose according to claim 3 wherein said vulcanizing accelerator is one member selected from the group consisting of thiurams, dithiocarbamate salts, thiazoles and combinations thereof.

6. The hose according to claim 4 where said organic peroxide is one member selected from the group consisting of
di-t-butyl peroxide, dicumyl peroxide, 2,5-dimethyl-2,5di-t-butylperoxyhexane,
2,5-dimethyl-2,5-di-t-butylperoxyhexane-3 and
1,3-bis(t-butylperoxyisopropyl)benzene.

7. The hose according to claim 2 wherein said vulcanizing agent is present in a mol ratio of from 1/10 to 1/300 per 100 parts by weight of said base rubber.

8. The hose according to claim 1 wherein said inner tube has a thickness of from 1 to 5 mm.

* * * * *

UNITED STATES PATENT AND TRADEMARK OFFICE
CERTIFICATE OF CORRECTION

PATENT NO. : 5,112,660
DATED : May 12, 1992
INVENTOR(S) : Tomoji Saito; Akira Sato It is certified that error appears in the above-identified patent and that said Letters Patent is hereby corrected as shown below:

Claim 1, column 5, line 68, after "50," insert --said--.

Claim 1, column 6, lines 3 and 4, change "1,1,1, 2-tetrafluroethane" to --1,1,1,-2-tetrafluoroethane--

Claim 6, column 6, line 65, change "where" to --wherein--.

Claim 6, column 7, line 1, change "2,5-dimethyl-2,5di-t-butylperoxyhexane." to --2,5-dimethyl-2,5-di-t-butylperoxyhexane,--.

Signed and Sealed this

Seventh Day of September, 1993

Attest:

BRUCE LEHMAN

*Attesting Officer*    *Commissioner of Patents and Trademarks*